Patented Jan. 6, 1953

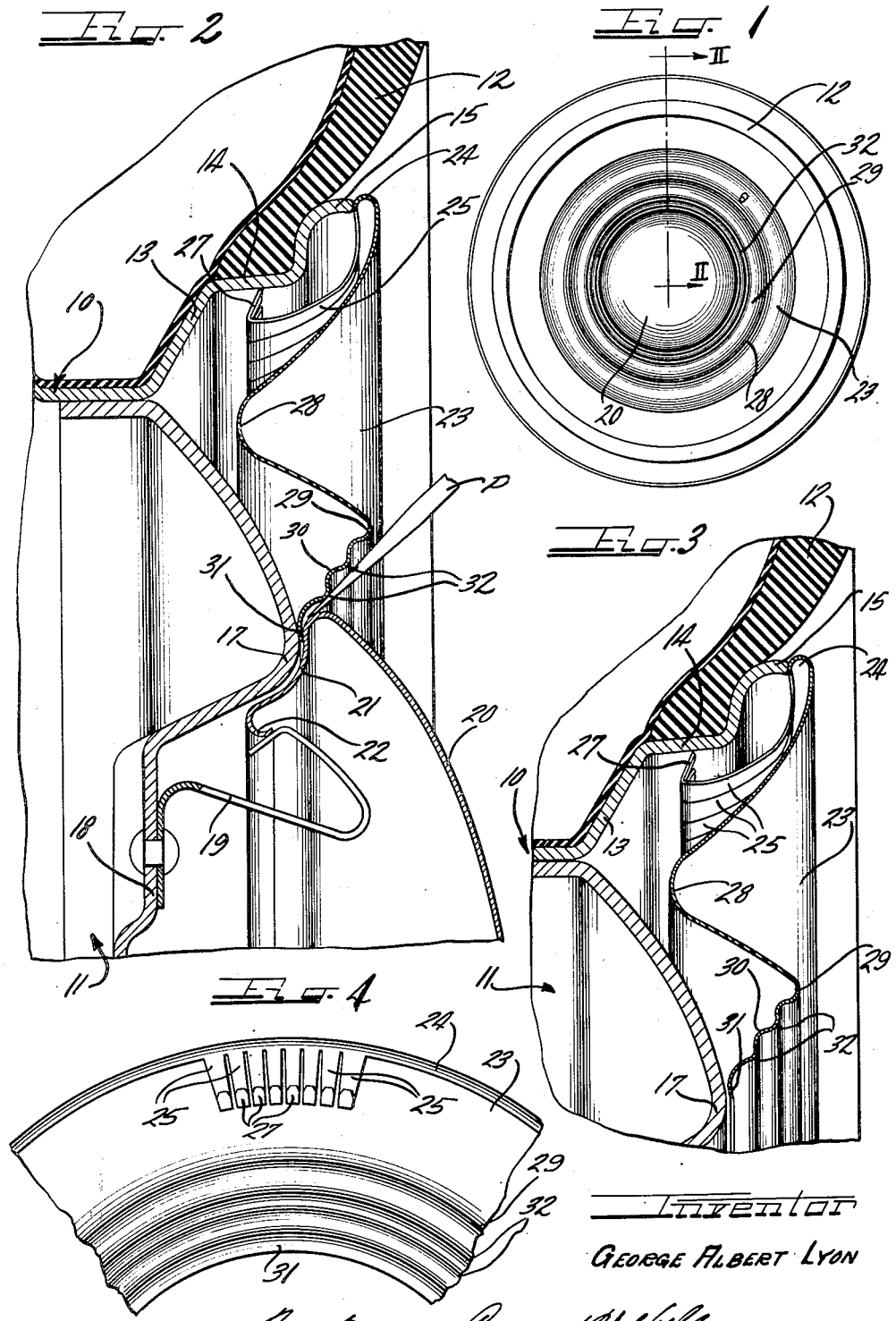

2,624,637

UNITED STATES PATENT OFFICE 2,624,637

WHEEL TRIM ASSEMBLY

George Albert Lyon, Detroit, Mich.

Application September 30, 1947, Serial No. 776,975

10 Claims. (Cl. 301—37)

This invention relates to improvements in wheel trim assembly and more particularly to a novel trim structure adapted to be applied to the outer side of a vehicle wheel.

An important object of the present invention is to provide an improved wheel trim structure which is adapted to be self-retaining when applied to the outer side of a wheel.

Another object of the invention is to provide a wheel trim having improved retaining means for attachment to a wheel.

A further object of the invention is to provide an improved wheel trim which includes structure adapted to be associated with a hub cap on the wheel and having improved means for avoiding pry-off tool damage in prying the hub cap free from the wheel.

According to the general features of the invention there is provided a wheel trim adapted to be applied to the outer side of a wheel including a body portion and a multi-flanged tire rim, the trim including means for self-attachment to the tire rim in concealing relation to the tire rim and a portion engageable with the wheel body and arranged to be clamped to the wheel body by a hub cap applied thereto, the trim member having a pry-off shoulder for fulcruming a pry-off tool thereagainst in dislodging the hub cap.

According to other general features of the invention the pry-off shoulder comprises a series of corrugations.

According to other general features of the invention there is provided a trim ring adapted to to be applied to the outer side of a vehicle wheel in covering relation to the tire rim thereof, the trim ring including an underturned portion extending generally radially and axially inwardly from the outer margin thereof and having generally radially outturned terminal biting fingers thereon, said underturned portion comprising a plurality of relatively narrow, closely spaced tabs affording multiple rim engagement in a relatively small peripheral area.

Other objects, features and advantages of the present invention will be readily apparent from a detailed description of a preferred embodiment thereof taken in conjunction with the accompanying drawings, in which:

Figure 1 is a side elevational view of a vehicle wheel assembly embodying features of the invention;

Figure 2 is a radial sectional view on an enlarged scale taken substantially on the line II—II of Fig. 2;

Figure 3 is a radial sectional view similar to Fig. 2 but showing the assembly in the condition found before application of the hub cap; and Figure 4 is a fragmentary rear elevational view of the trim ring member.

As shown on the drawings:

A wheel with which the present invention is adapted to be used may be of conventional form including a tire rim 10 and a wheel body 11, both the tire rim and the wheel body comprising suitable gauge sheet metal, the wheel body being a stamping and the tire rim being either a stamping or a rolled section. The tire rim is preferably of the multi-flanged drop center type adapted for supporting a pneumatic tire and tube assembly 12 and having a base flange from which extends a pair of side flanges 13 merging with the usual intermediate generally axially extending flanges 14 from which project the customary terminal flanges 15.

The wheel body 11 comprises an intermediate annular axially outwardly bulging nose reinforcement 17 coaxial with a dished central bolt-on flange 18 carrying a plurality of usual hub cap retaining clips 19 by which a hub cap 20 is secured in snap-on pry-off relationship to the wheel body. The hub cap has an underturned marginal skirt 21 which is generally conformable with the nose bulge 17 and is adapted to seat thereon, an underturned bead 22 at the extremity of the skirt being engageable with the clips 19.

Applicable to the outer side of the wheel in covering relation to that portion thereof which intervenes between the hub cap and the tire 12, is a trim ring member 23. This trim ring is adapted to be made from suitable sheet metal and may comprise a rolled section or a stamping as preferred. The radial extent of the trim ring 23 is preferably such that its outer margin overlies the tire rim terminal flange 15 while its inner margin engages the nose bulge 17 behind the shoulder provided by the underturned hub cap skirt 21.

For securing the trim ring member 23 to the wheel, it is provided with integral means at its outer margin for engaging the tire rim 10. To this end, the outer margin of the trim ring member is preferably turned generally axially and radially inwardly to provide a reinforcing and finishing bead formation 24 which in the present instance is adapted to bear against the tire rim terminal flange extremity. From the edge of the bead 24 extend radially inwardly a limited group of relatively narrow, closely spaced resilient tabs 25. As best seen in Fig. 4 such a group of tabs may comprise several individual tabs herein being shown as eight in number. There are as many of the groups of tabs as desired provided in annular series and preferably equally spaced relation about the margin of the trim ring member 23.

Each of the tabs 25 extends sufficiently radially inwardly and then turns generally axially inwardly to lie at its extremity opposite the intermediate flange 14 of the tire rim in the assembled condition of the cover. Extending integrally and generally radially outwardly and biased slightly axially outwardly from each tab is a biting finger terminal 27 which is adapted to enter into biting, stressed retaining engagement with the tire rim intermediate flange 14. To this end the tabs 25 and the biting finger terminals 27 thereof are of such initial construction that they normally tend to flex to a finger and circumference of greater diameter than the diameter defined by the radially inner surface of the tire rim flange 14. Thus when the trim ring 23 is to be applied to the wheel it is pushed axially inwardly and the biting finger terminals 27 cam along the intermediate flange 14 with progressively increasing tension until the trim ring is fully seated in which condition the biting fingers afford a secure retention, tending to bite even more securely into the surface of the flange 14 should force be applied to the trim ring in an axially outward direction tending to dislodge the same.

Since each of the fingers 27 is narrow and is individually carried by individual relatively long tab 25 independently of any of the other tabs 25, insofar as flexure thereof is concerned it will be readily apparent that each of the fingers will find an optimum retaining engagement with the tire rim intermediate flange 14 and irregularities in the surface contour of the tire rim terminal flange or manufacturing tolerances in the tire rim or in the trim ring are effectively compensated for.

By preference the trim ring 23 is formed at least in the radially outer portion thereof to afford substantial simulation of the tire side wall curvature and is thus of generally convex cross section extending from its outer edge generally radially and axially inwardly to an intermediate generally axially inwardly extending juncture rib 28 from which the radially inner portion of the trim ring sweeps on a generally radially inward and axially outward taper to a ridge 29. The axially outward projection of the ridge 29 is preferably less than the outer margin of the trim ring but greater than the shoulder of the hub cap 20. From the ridge 29 the radially inner margin of the trim ring member slants generally radially inwardly and axially inwardly to engagement with the nose bulge 17 of the wheel body and provides a shoulder 30 generally facing the hub cap 20. The terminal portion of the shoulder margin 30 is preferably formed as a flange 31 arranged to be clamped flatwise between the nose bulge 17 and the shoulder of the hub cap.

The principal purpose of the shoulder 30 is to afford pry-off fulcrum for a pry-off tool P for removing the hub cap 20. Thus, as best seen in Fig. 2 the end of the pry-off tool which may comprise a screw driver is adapted to be inserted between the shoulder edge of the hub cap and the shoulder 30 of the trim ring, the flange 31 being so disposed that a slight clearance is afforded for this purpose. Then by fulcruming the pry-off tool against the shoulder 30 the hub cap can be readily pried loose. For stiffening the shoulder 30, it is preferably formed with a plurality of corrugations 32 which are preferably arranged in symmetrical sequence with the ridge 29 so that the pry-off tool will engage the same successively, first contacting the corrugation nearest the hub cap and then the corrugation next in order until the ridge 29 is engaged as the principal fulcrum point. Thus, in effect, the shoulder 30 provides a plurality of successively engageable fulcrum points, the first of which fulcrum points is nearest the hub cap and thus affords maximum leverage power in the initial pry-off thrust where such maximum power is most needed.

It may also be noted that the ridge 29 of the trim ring provides an annular buffer about the edge of the hub cap which protects the hub cap edge against engagemnt by obstructions in the service operation of the wheel and which would tend to dislodge the hub cap unintentionally.

In order to assure a more thorough retention of the trim ring 23 upon the wheel, it is constructed so that when it is initially applied to the wheel, before the hub cap is applied to the wheel, the central portion of the trim ring including the shoulder 30 and the terminal flange 31 are out of engagement with the wheel body nose 17. Then, when the hub cap 20 is applied to the wheel the hub cap shoulder presses the central portion of the trim ring against the wheel body and places the entire trim ring structure under axially inward stress which causes the retaining fingers 27 of the trim ring to effect even more thorough engagement with the intermediate flange 14 of the tire rim.

Should it become necessary to remove the trim ring 23 that can be accomplished by inserting a tool therebehind and drawing the relatively flexible retaining finger tabs 25 radially inwardly so that the retaining fingers 27 are flexed out of engagement with the tire rim. For example, a flat tool may be inserted between the turned edge 24 of the trim ring and the terminal flange 15 of the tire rim and projected into stressing engagement with the radially outer faces of the axially inner portions of the tabs 25 or at the reentrant juncture thereof with the retaining fingers 27.

I claim as my invention:

1. A wheel trim member adapted to be applied to the outer side of a wheel including a body portion and a multi-flanged tire rim, the trim member including means for self-attachment to the tire rim in concealing relation to the tire rim and a portion engageable with the wheel body and arranged to be clamped to the wheel body by a hub cap applied thereto, the trim member having a pry-off shoulder for fulcruming a pry-off tool thereagainst in dislodging the hub cap, the pry-off shoulder occupying but a limited annular area of the body portion adjacent to the portion to be clamped by the hub cap and having a face directed generally toward the position occupied by the hub cap and comprising a series of corrugations.

2. In a wheel trim structure for application to the outer side of a vehicle wheel including multi-flanged tire rim, a circular body portion for concealing disposition relative to the tire rim, the outer margin of the body portion having an underturned part including a plurality of closely spaced narrow arched flexible tabs of substantial length extending radially inwardly and axially inwardly and having generally radially outwardly projecting terminal biting fingers thereon which are substantially shorter than the tabs and adapted when the trim structure is applied to the wheel to make biting retaining engagement with the intermediate flange of the tire rim.

3. In a trim ring for application to the outer side of a vehicle wheel including a multi-flanged tire rim and a load sustaining body part, the outer margin of the trim ring having an underturned portion including tabs projecting generally radially and axially inwardly and terminating in generally radially outwardly extending biting finger portions, the radially inner portion of the trim ring structure being adapted for engagement with the wheel body but in the initial application to the wheel remaining out of engagement with the wheel body while the radially outer portion of the trim ring structure engages the tire rim, said biting fingers being engageable with the intermediate flange of the tire rim, and the radially inner portion of the trim ring structure being engageable by a hub cap and clamped against the wheel body by placing the trim ring structure under tension and increasing the retaining engagement of said biting fingers with the intermediate tire rim flange.

4. In a trim ring structure of the character described, a radially outer portion adapted for concealing disposition with respect to the tire rim of a vehicle wheel, the radially inner portion being constructed and arranged to be disposed opposite the body of the tire and engageable by a hub cap applied to the wheel for clamping the same to the wheel body, said radially inner portion including a shoulder facing generally toward the hub cap and having a series of annular projections affording progressively engageable fulcrums for a pry-off tool applied to the hub cap.

5. In a trim ring of the character described, a radially outer portion having underturned retaining means for engagement with the tire rim of a vehicle wheel to which the trim ring is applied, a radially inner portion of the trim ring having an outwardly protruding annular ridge defined at its radially inner side by a tapering portion engageable with the wheel body and projecting axially outwardly therefrom for affording a fulcrum ridge by which a pry-off tool is adapted to be levered against a hub cap on the wheel, the portion of the trim ring radially outwardly of said fulcrum ridge being substantially depressed relative to the ridge and spaced radially outwardly therefrom completely out of pry-off leverage range of the pry-off tool fulcrumed on the ridge.

6. In a wheel structure including a tire rim and a load sustaining body part, a trim ring for substantially concealing the tire rim and having a portion thereof in concealing relation to the radially outer part of the wheel body, a hub cap supported by the wheel body and clampingly engaging the radially inner margin of the trim ring, the trim ring having a pry-off fulcrum rib protruding axially beyond and in adjacent spaced relation to the periphery of the hub cap and providing a narrow ridge adapted to receive a pry-off tool thereagainst in prying the hub cap from the wheel, the portion of the trim ring radially outwardly of said fulcrum rib being substantially depressed relative to the ridge and spaced radially outwardly therefrom completely out of leverage range of the pry-off tool fulcruming on the ridge for hub cap pry-off.

7. In a trim ring for disposition at the outer side of a multi-flanged tire rim and the adjacent load sustaining body portion of a vehicle wheel, radially inner and outer annular portions having juncture on an annular inwardly extending rib, said outer portion having an arched cross section and an underturned outer margin, retaining means on said margin comprising a plurality of elongated flexible arched tabs projecting radially and axially inwardly from said underturned margin and having relatively short and stiff generally radially outwardly extending engagement finger terminals engageable with the intermediate flange of the tire rim for retaining the cover in place on the wheel, said inner annular portion comprising a rib projecting to a substantial extent axially outwardly beyond said inwardly extending rib and having a generally radially and axially inwardly sloping inner portion terminating in a radially inner flange engageable against the wheel body in position to be clamped thereagainst by a hub cap.

8. In a trim ring for disposition at the outer side of a multi-flanged tire rim and the adjacent load sustaining body portion of a vehicle wheel, radially inner and outer annular portions having juncture on an annular inwardly extending rib, said outer portion having an arched cross section and an underturned outer margin, retaining means on said margin comprising a plurality of elongated flexible arched tabs projecting radially and axially inwardly from said underturned margin and having relatively short and stiff generally radially outwardly extending engagement finger terminals engageable with the intermediate flange of the tire rim for retaining the cover in place on the wheel, said inner annular portion comprising a rib projecting to a substantial extent axially outwardly beyond said inwardly extending rib and having a generally radially and axially inwardly sloping inner portion terminating in a radially inner flange engageable against the wheel body in position to be clamped thereagainst by a hub cap, said sloping inner portion of said rib having a plurality of small radius annular corrugations therein affording pry-off tool fulcrum ridges and affording a symmetrical pattern with the ridge of the rib.

9. In a wheel structure including a wheel having flanged tire rim and body parts and a central hub cap detachably retained on the body part, an annular trim ring extending radially outwardly beyond the hub cap over the body part and having a radially inner margin in the form of a sharp crest rigidifying hub-cap-pry-off tool leverage rib projecting axially outwardly substantially beyond and in radially outwardly spaced adjacency to the outer edge of the hub cap, the radially inner side of said rib being inclined axially and radially inwardly toward the body part and terminating in a radially inwardly extending seat for the outer edge of the hub cap to bear against and clamped against the wheel body by the hub cap, the trim ring radially outwardly of said rib extending into radially outwardly and axially inwardly offset relation to the crest of the rib so as to afford complete pry-off tool leverage clearance.

10. In a wheel structure including a wheel having flanged tire rim and body parts and a central hub cap detachably retained on the body part, an annular trim ring extending radially outwardly beyond the hub cap over the body part and having a radially inner margin in the form of a sharp crest rigidifying hub-cap-pry-off tool leverage rib projecting axially outwardly substantially beyond and in radially outwardly spaced adjacency to the outer edge of the hub cap, the radially inner side of said rib being inclined axially and radially inwardly toward the body part and terminating in a radially inwardly extending seat for the outer edge of the hub cap to bear against and clamped against the wheel body by the hub cap, the trim ring radially outwardly of said rib extending into radially outwardly and axially inwardly offset relation to the crest of the rib so as to afford complete pry-off tool leverage clearance, the radially outer portion of said trim ring being dished adjacent the rib, and the radially outer edge of the trim being turned under and disposed opposite a flange of the rim part.

GEORGE ALBERT LYON.

REFERENCES CITED

The following references are of record in the file of this patent:

UNITED STATES PATENTS

| Number | Name | Date |
| --- | --- | --- |
| Re. 19,467 | Lyon | Feb. 12, 1935 |
| 2,113,541 | Blank | Apr. 5, 1938 |
| 2,200,205 | Lyon | May 7, 1940 |
| 2,214,746 | Lyon | Sept. 17, 1940 |
| 2,214,747 | Lyon | Sept. 17, 1940 |
| 2,368,228 | Lyon | Jan. 30, 1945 |
| 2,368,232 | Aske | Jan. 30, 1945 |
| 2,404,389 | Lyon | July 23, 1946 |